United States Patent
Kim et al.

(10) Patent No.: US 7,283,444 B2
(45) Date of Patent: Oct. 16, 2007

(54) METHOD AND DEVICE FOR DETERMINING DISK SIZE AND STOPPING A ROTATING DISK WITHOUT USING FREQUENCY GENERATOR SIGNALS

(75) Inventors: Dong Sik Kim, Seoul (KR); Tae Ki Shin, Seoul (KR); Myeong Su Jeong, Seoul (KR); Beom Jim Kim, Siheong-si (KR)

(73) Assignee: LG Electronics Inc., Seoul (KR)

( * ) Notice: Subject to any disclaimer, the term of this patent is extended or adjusted under 35 U.S.C. 154(b) by 161 days.

(21) Appl. No.: 10/309,189

(22) Filed: Dec. 4, 2002

(65) Prior Publication Data

US 2003/0103430 A1    Jun. 5, 2003

(30) Foreign Application Priority Data

Dec. 4, 2001   (KR) .................. 10-2001-0076331
Mar. 13, 2002  (KR) .................. 10-2002-0013429

(51) Int. Cl.
    G11B 7/00    (2006.01)
(52) U.S. Cl. ................ 369/47.42; 369/53.2; 369/47.11; 369/53.29
(58) Field of Classification Search ............... 369/53.2, 369/53.29, 47.42, 47.44, 47.55, 53.37
    See application file for complete search history.

(56) References Cited

U.S. PATENT DOCUMENTS

| | | | | |
|---|---|---|---|---|
| 4,949,323 A | * | 8/1990 | Yoshida | 369/30.14 |
| 4,979,048 A | * | 12/1990 | Shimada et al. | 386/105 |
| 5,390,162 A | * | 2/1995 | Fukumoto et al. | 369/116 |
| 5,675,586 A | * | 10/1997 | Sako et al. | 714/701 |
| 5,715,157 A | * | 2/1998 | Kuhn | 369/47.42 |
| 6,414,915 B2 | * | 7/2002 | Seo | 369/30.1 |

FOREIGN PATENT DOCUMENTS

| | | |
|---|---|---|
| JP | 02-260281 A | 10/1990 |
| JP | 04-328363 A | 11/1992 |

\* cited by examiner

*Primary Examiner*—William Korzuch
*Assistant Examiner*—Peter Vincent Agustin
(74) *Attorney, Agent, or Firm*—Birch, Stewart, Kolasch & Birch, LLP

(57) ABSTRACT

A method and device for determining the presence or absence of a disk and/or a disk size without using FG signals, are provided. The method includes placing a pickup at a first zone on the optical recording medium, the first zone located between an outer radius of a first recording medium type and an outer radius of a second recording medium type, where the outer radius of the second recording medium type is larger than the outer radius of the first recording medium type; detecting a reflected signal based on a returned beam from the first zone of the optical recording medium; and determining at least one of a size and an absence of the optical recording medium based on the detected reflected signal. Therefore, an FG sensor that is provided in a general disk device can be eliminated, thereby reducing the size and cost of a disk device.

27 Claims, 4 Drawing Sheets

| Time (msec) | average movement distance of a pickup (radius in cm unit) |
|---|---|
| 100 | 2.8 |
| 200 | 3.3 |
| 220 | 3.4 |
| 240 | 3.6 |
| 260 | 3.7 |
| 280 | 3.8 |
| 300 | 3.9 |
| 320 | 4.0 |
| 350 | 4.2 |
| 400 | 4.5 |
| 450 | 4.8 |
| 480 | 4.95 |
| 500 | 5.1 |
| 520 | 5.2 |
| 550 | 5.35 |
| 600 | 5.6 |
| 650 | 5.9 |

Note : Sx is a starting sector number of a physical track at radius rX

METHOD AND DEVICE FOR DETERMINING DISK SIZE AND STOPPING A ROTATING DISK WITHOUT USING FREQUENCY GENERATOR SIGNALS

The present application claims the benefit of Korean Patent Application No. 2002-0013428 filed on Mar. 13, 2002, which is herein fully incorporated by reference.

BACKGROUND OF THE INVENTION

1. Field of the Invention

The present invention relates to a method and device for determining a disk size and stopping a rotating disk and, more particularly, to a method and device for determining the presence or absence of a disk and/or the disk size and calculating an exact brake-voltage applying time for stopping a rotating disk without the use of frequency generator (FG) signals.

2. Description of the Background Art

FIG. 1 shows a block diagram of a general disk device. As shown, the disk device of FIG. 1 includes an optical pickup 11 detecting signals recorded on an optical disk 10; a disk tray 19 receiving the optical disk 10 therein; a radio frequency (RF) unit 12 producing a binarized signal and servo error signals by selectively combining the detected RF signals; a digital signal processor (DSP) 13 restoring original data from the binarized signal; a spindle motor 14 rotating the disk 10 at a high speed; a sled motor 15 moving the pickup 11 radially on the disk 10; a driving unit 16 driving the spindle motor 14 and the sled motor 15; and a controller 17 controlling the overall operation of the disk device.

The spindle motor 14 includes a frequency generator (FG) sensor 141 that produces a pulse train (called an 'FG signal' in general) during the rotation of the motor 14. The FG signal is applied to the controller 17 as shown in FIG. 1.

The disk device configured as above uses the FG signal from the FG sensor 141 to judge whether or not a disk has been placed on a disk tray and whether the placed disk is a 8 cm disk (i.e., in diameter), or a 12 cm disk. The details of this judging operation are as follows.

When the disk tray 19 having the disk 10 thereon is closed, the controller 17 applies a driving voltage to the spindle motor 14 for a predetermined time Tc through the driving unit 16.

It is well recognized that the lighter the disk is, the faster it rotates by an applied constant force. In other words, the lighter a load applied to the spindle motor 14 is, more pulses the FG sensor 141 outputs for a given time window. Therefore, the controller 17 counts a number of pulses in the FG signal input for the duration of the time Tc and compares this counted value (pulse number) with two references $T_{NL}$ and $T_{NH}$, where $T_{NL}<T_{NH}$. If the counted value is greater than $T_{NH}$, the controller 17 judges that there is no disk. If the counted value is between $T_{NH}$ and $T_{NL}$, it judges that the placed disk is a 8 cm disk. If the counted value is smaller than $T_{NL}$, then it judges the placed disk is a 12 cm disk.

Because the number of pulses per a unit time, e.g., one second, is indicative of a disk rotation speed, the disk device of FIG. 1 uses the FG signal output from the FG sensor 141 to determine the duration and/or amplitude of a brake voltage suitable to stop a rotating disk.

For example, if a disk stop is requested during the rotation of the disk, the controller 17 counts pulses of the FG signal for a predetermined time period to know how fast the spindle motor 14 is rotating, and applies a brake voltage during a time suitable to stop that speed. As a result, the rotating spindle motor 14 slows down and ultimately stops.

If the brake voltage applying time were not determined properly by using the above-discussed method, the rotating disk would not be stopped properly or would be rotated in a reverse direction. If the user opens the disk tray while the disk is still rotating thereon, the opening of the disk tray will cause damage to the rotating disk or injury to the user.

Another method to stop a rotating disk is to apply a brake voltage until no pulse is output from the FG sensor 141. This method may ensure that the rotating disk is appropriately stopped.

As aforementioned, the FG sensor in the spindle motor of a general disk device is used to determine the presence or absence of a disk in the disk device, and/or to stop the disk rotating in the disk device. However, equipping the disk device with an FG sensor increases the size and production cost of the disk device. Since disk devices are generally mass produced, there is a need to reduce the size and production cost of the disk device, if possible, by eliminating one or more parts of the general disk device.

SUMMARY OF THE INVENTION

Accordingly, it is an object of the present invention to provide a method and device for determining the presence or absence of a disk and/or a disk size and for stopping a disk rotating at a high speed without the use of an FG sensor, thereby reducing the size and cost of a disk device.

It is another object of the present invention to provide a method and device for determining the presence or absence of a disk and a disk size and stopping a rotating disk, which eliminate the problems and disadvantages associated with the background art methods and devices.

A method of determining at least one of a size and an absence of an optical recording medium according to en embodiment of the present invention, includes: (a) placing a pickup at a first zone on the optical recording medium, the first zone located between an outer radius of a first recording medium type and an outer radius of a second recording medium type, where the outer radius of the second recording medium type is larger than the outer radius of the first recording medium type; (b) detecting a reflected signal based on a returned beam from the first zone of the optical recording medium; and (c) determining at least one of a size and an absence of the optical recording medium based on the detected reflected signal.

A device for determining a size of an optical recording medium according to an embodiment of the present invention, includes: a pickup to access the optical recording medium; a signal processing unit to detect a reflected signal from the optical recording medium; and a controller to determine a size of the optical recording medium by using the reflected signal and without using frequency generator (FG) signals.

A method of stopping a rotating optical recording medium in a recording medium device according to an embodiment of the present invention, includes: (a) determining position information on a current position of a pickup on the rotating recording medium when a recording medium rotation stop request is received; (b) determining a brake voltage applying time based on the determined position information; and (c) applying a brake voltage to a motor for a duration of the determined brake voltage applying time to stop the rotating recording medium.

A device for stopping a rotating optical recording medium according to an embodiment of the present invention, includes: a pickup to access the optical recording medium; a motor to rotate the optical recording medium; and a controller to control the pickup and the motor, to determine a brake voltage applying time to stop the rotating recording medium without using frequency generator (FG) signals, and to apply a brake voltage to the motor for a duration of the determined brake voltage applying time to stop the rotating recording medium.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF THE PREFERRED EMBODIMENTS

Figure 1:
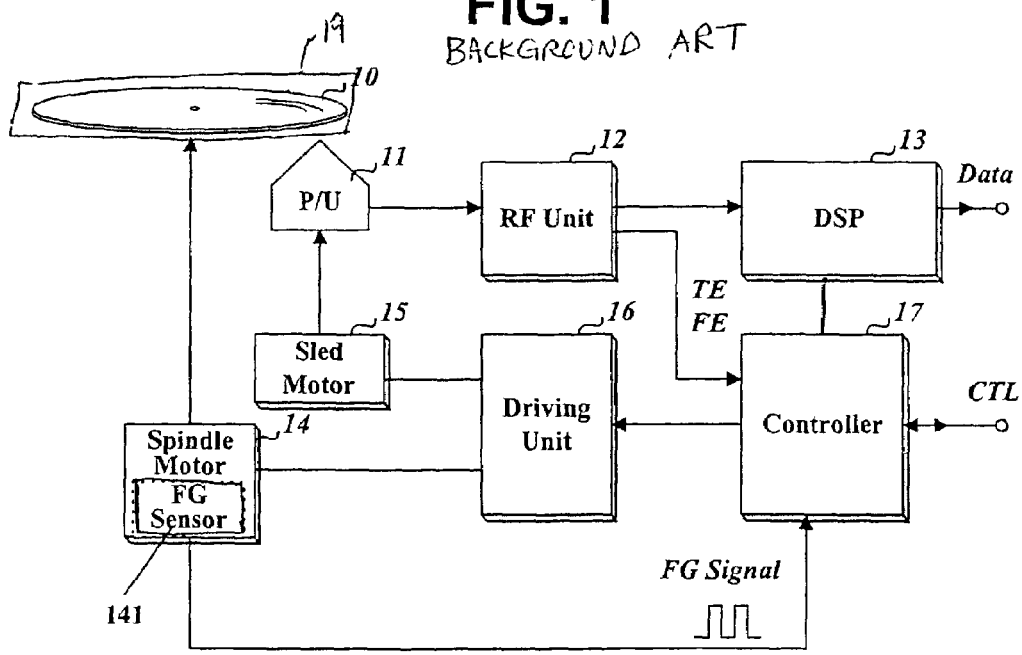
FIG. 1 shows a block diagram of a general disk device.

In order that the invention may be fully understood, the preferred embodiments of the present invention will now be described with reference to the accompanying drawings. Same reference numerals are used in the drawings to indicate the same elements.

Figure 2:
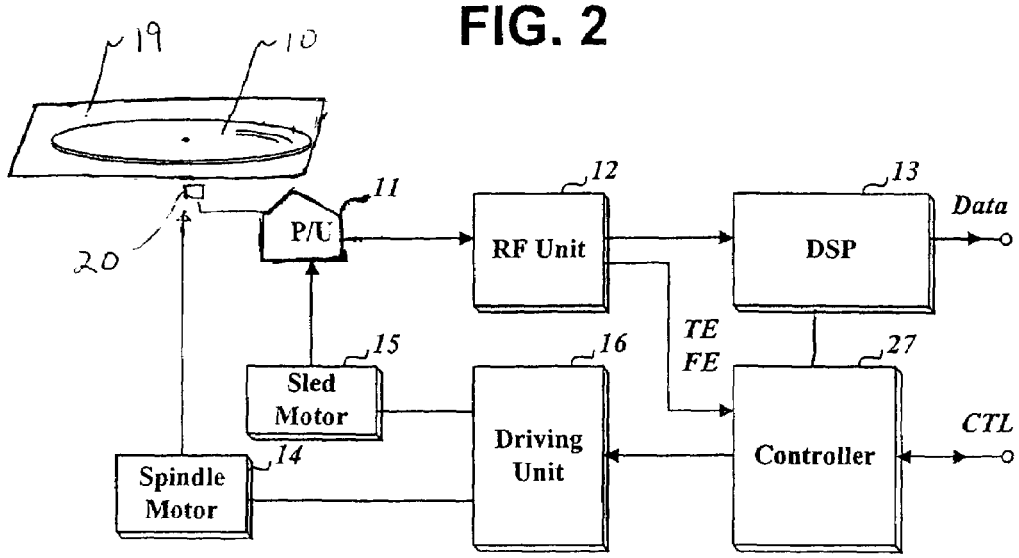
FIG. 2 is a block diagram of an example of a disk device according to an embodiment of the present invention.

FIG. 2 is a block diagram of a disk device according to an embodiment of the present invention. A method of determining the presence or absence of a disk and a disk size, and of stopping a rotating disk without the use of an FG sensor, is implementable in the disk device shown in FIG. 2.

As shown in FIG. 2, the disk device includes an optical pickup 11, a disk tray 19 for receiving a disk or other optical recording medium 10 thereon, a limit switch 20 limiting the movement of the pickup 11 over the disk 10, an RF unit 12, a DSP 13, a spindle motor 14, a sled motor 15, a driving unit 16, and a controller 27, all operatively coupled. Particularly, no FG sensor 141, which is included in the general disk device of FIG. 1, is present in the spindle motor 14 or any part of the disk device shown in FIG. 2. Thus, no FG signal is used in the disk device and method of FIG. 2.

The controller 27 carries out two algorithms (or methods), in addition to other conventionally known algorithms. These two algorithms are explained below in detail. The first algorithm detects the presence or absence of a disk, and/or a disk size. The second algorithm stops a rotating disk with precision. Both the first and second algorithms are performed without using FG signals.

Figures 3, 4:
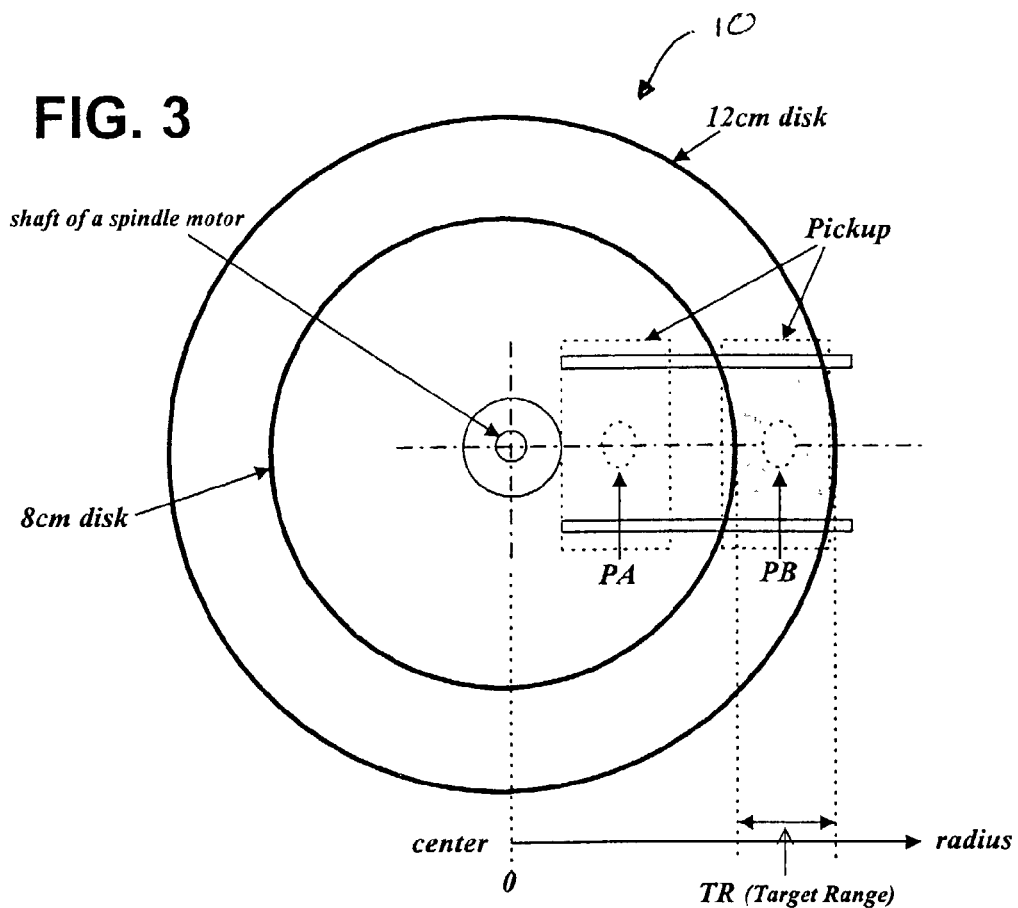
FIG. 3 is an example of a diagram for explaining a disk size/presence determining method according to an embodiment of the present invention.
FIG. 4 is an example of a table depicting a relation of push (kick) voltage applying time vs. average moving distance of an optical pickup according to an embodiment of the present invention.

The first algorithm for detecting the presence or absence of a disk and for determining a disk size will be now described in detail referring to FIGS. 2 and 3. FIG. 3 shows an example of the disk 10 controllable using the technique of the present invention.

When the disk tray 19 is closed, the controller 27 drives the sled motor 15 through the driving unit 16 to move the optical pickup 11 to a position PB shown in FIG. 3. In this example, the position PB on the disk 30 is at or about 5 cm away from the center of a driving shaft of the spindle motor 14 in the radial direction of the disk. At the position PB, the controller 27 turns on an internal laser diode or light source of the optical pickup 11, so that a light beam impinges onto the position PB on the disk 10. Then the controller 27 checks whether or not a valid focusing error (FE) signal whose level is greater than a threshold is detected and output from the RF unit 12. The FE signal is generally a reflected signal and can be specifically a servo error signal.

If a valid FE signal is output by the RF unit 12 in response to the light beam impinging onto the position PB on the disk 10, it means that a disk is present at the position PB. Thus, the controller 27 judges that the disk 10 is currently placed in the tray 19, and is a 12 cm-diameter disk. If an FE signal with a level greater than the threshold is not output from the RF unit 12 in response to the light beam impinging onto the position PB on the disk 10, the controller 27 then moves the pickup 11 to a second position, an inner position PA shown in FIG. 3. In one embodiment, the most inner position is preferable as the position PA.

The controller 27 then controls the light source of the optical pickup 11 to impinge a light beam onto the position PA on the disk 10. The controller 27 checks the FE signal again in response to the light beam impinging onto the position PA. If a valid FE signal is detected from the RF unit 12, then the controller 27 judges that the disk is currently placed on the disk tray 19 and is a 8 cm-diameter disk. Otherwise, it judges that 'no disk' is present on the disk tray 19 of the disk device, i.e., it detects the absence of a disk on the disk tray 19.

It should be noted that the positions PA and PB can vary depending on the different sizes and/or types of optical recording mediums to be detected. For instance, the position PB is located between an outer radius of a first disk type and an outer radius of a second disk type. Further, additional positions can be defined to detect an FE signal therefrom if more than two different disk sizes are available.

In order to make the above-explained disk size determining method more reliable, the movement of an optical pickup to the position PB pointed in FIG. 3 must be always guaranteed in any disk device. Because disk devices may differ slightly from each other in the electrical and mechanical characteristics of respective sled motors, the same driving inputs to the different disk devices may cause their optical pickups to move in different distance amounts. This factor should be taken into consideration when moving an optical pickup to the position PB and from the position PB to PA or to any other preset position on the disk.

FIG. 4 is a table showing an example of a relation of an average pickup movement distance vs. pickup applying time (for 1.24V push (kick) voltage), for moving an optical pickup from desired positions on a disk according to an embodiment of the present invention. The numbers listed in the table were obtained from conducting experiments on many various disk devices. In the table shown in FIG. 4, as an example, the push voltage of 1.24V is applied to pickups to move the pickups to desired positions. That is, the table identifies the push voltage applying time needed to move the pickup for a specific distance, when the push voltage of 1.24V is used. However, other push voltages may be used. If so, then different pickup applying times may be obtained depending on the level of the push voltage.

In the example of FIG. 4, the inventors have determined that a target range TR to guarantee a reliable and accurate determination of a disk size is at or about 4~6 cm with respect to the disk radius. It can be known from the table of FIG. 4 that the pickup will be moved into the target range TR marked in FIG. 3 if a 1.24V push voltage is applied for the duration of 320~650 msec, after the limit switch 20 installed for preventing collision of the optical pickup 11 to the disk inner wall is turned ON. Because there is a variation of movement distance for different pickups, it may be preferable to place the pickup at or near 5 cm from the center of the disk in accordance with one embodiment. In that case, according to the table of FIG. 4, 450~520 msec would be most suitable applying time for the push voltage of 1.24V.

In one embodiment, to position the pickup at the position PB, then the controller 27 first moves the pickup 11 in the inward direction of the disk 10 until the limit switch 20 is turned ON. When the limit switch 20 is turned ON, the controller 27 applies an appropriate push voltage to the sled motor 15 for a certain time duration, e.g., for 450~520 msec. This will move the pickup 11 to be properly positioned at or near the position PB in FIG. 3. Namely, this would ensure that the center of an objective lens of the pickup 11 is at about 5 cm distant from the center of the driving shaft of the spindle motor 14.

In one embodiment, the optical pickup 11 is moved to the position PB in advance while the disk tray 19 is still opened, before or after a disk is placed on the disk tray 19. Then the size of the disk on the disk tray 19 can be determined immediately at the moment the tray 19 is closed. This scheme reduces the time taken from the insertion of a disk to the completion of the disk size determination process, thereby reducing significantly the disk size determining time.

As discussed, although the values in the table of FIG. 4 have been determined for using a 1.24V kick voltage, the invention is not limited to such, and the values for using a different kick voltage for moving an optical pickup can be tabulated.

Accordingly, the method for determining the presence and/or size of the disk according to the present invention is performed without the use of an FG sensor or FG signals Next, the second algorithm of the controller 27 for stopping the rotation of a spindle motor (i.e., a rotating disk) without using FG signals or an FG sensor is now described in detail.

To carry out the second algorithm of the controller 27, two parameters must be known beforehand. The first parameter is the radius r1 at the start position of a program (data) area on a disk placed on the disk tray, and the second parameter is a brake voltage applying time t1 in case that a reproducing point (current position of the pickup) on the currently placed disk is at the start position of the program area. Generally, the radius r1 is 25 mm for a CD (Compact Disk) and 24 mm for a DVD (Digital Versatile Disk) regardless of the disk size according to known standards. Then the brake voltage applying time t1 at the program area start position of a disk is determined through experiments, e.g., by applying a brake voltage for various time durations and examining the stopping results. The brake voltage applying time t1 will vary depending on the size and/or type of the disk.

By the way, a brake voltage applying time t at an arbitrary position on a disk is proportional to the rotation speed of the disk, namely, the angular velocity ω of the disk. That means t∝ω. Because of ω=v/r where v is a linear velocity (or a reproduction speed), then the following relationship is computed: t∝ω/r. The fact that the reproduction speed of the disk is constant leads to the relation of t∝1/r. As a result, the following proportional relation can be derived between the brake voltage applying time t at an arbitrary position on a disk and the pre-known brake voltage applying time t1 at the start position of the program area on the disk:

t:t1=1/4:1/r1, this gives $$t : t1 = 1/4 : 1/r1, \text{ this gives-}$$

$$t = \frac{r1 \times t1}{r} \quad (A)$$

where r can be expressed as $$r = r1 + p \times N \quad (B)$$

wherein p is a track pitch and N is a physical track number.

Since the track pitch p is a known constant for a disk, a brake voltage applying time t for a current location on the disk can be computed from Eqs. (A) and (B) if and only if the physical track number N is given.

Figure 5:
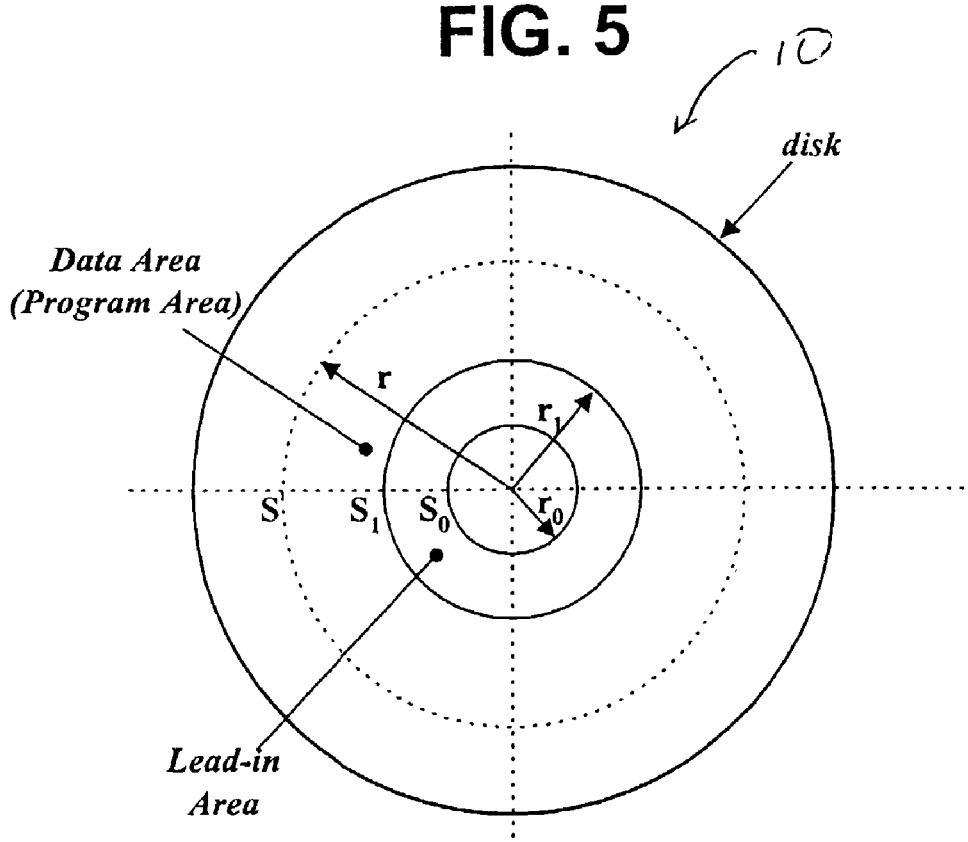
FIG. 5 is a diagram for explaining a derivation of an equation that gives a track number of a reproducing position from position information thereof according to an embodiment of the present invention.

The relation between a sector number and a physical track number of a disk, which constitute information on the current location (of the pickup) on the disk, can be derived from FIG. 5. Considering two areas of radii r and r0 respectively on a disk as shown in FIG. 5 gives $$pL(S-S_0) = \pi(r^2 - r_0^2) \quad (1)$$

where L is the length of a sector, Sx is a starting sector number of a physical track on a disk at radius $r_X$ (here, $S_0$ is 0 and $S_1$ is 0x30000h), and r0 is the radius of a physical track whose sector number and track number are all zero.

The variable r can be also expressed as $$r = r0 + p(N - N_0) \quad (2)$$

where Nx is track number of a physical track at $r_X$ ($N_0$=0). Applying Eq. (2) to Eq. (1) then gives $$pL(S-S_0) = \pi[(r_0 + p(N-N_0))^2 - r_0^2] \quad (3)$$

Applying $S_0$=0 and $N_0$=0 to Eq. (3) and then rearranging it with respect to N leads to the following equation:

$$pN^2 + 2r_0N - \frac{LS}{\pi} = 0 \quad (4)$$

Solving Eq. (4) for N gives the desired result of:

$$N = \frac{-r_0 + \sqrt{r_0^2 + p\frac{LS}{\pi}}}{p} \quad (5)$$

Now, the track number N can be calculated if r0 is known in case that the sector number S is given.

By the way, considering two circle areas of radius r1 and r0 respectively on a disk shown in FIG. 5, the radius r0 can be expressed in terms of constants related with the start position of a program area on the disk. Namely, $$pL(S_1-S_0)=\pi(r_1^2-r_0^2)$$

Rewriting this equation for r0 gives the following:

$$r_0 = \sqrt{r_1^2 - p\frac{LS_1}{\pi}} \quad (6)$$

If the disk currently placed on the disk tray is a DVD, r1 is 24 mm, L is 5.1571 mm in case it is a single-layer DVD, and 5.6755 mm in case it is a dual-layer DVD, the track pitch p is 0.74 μm, and $S_1$ is 0x30000h. All these values are known according to existing DVD standards. Applying these numerical values to Eq. (6) gives the actual value of r0.

Then, applying the obtained actual value of r0 to Eq. (5) gives the following two final equations:

$$N(TrackNo) = \frac{-18.362 + \sqrt{337.2 + 0.00121475 \cdot S(SectorNo)}}{1351.351351351^{-1}} \quad (7)$$

for a single-layer DVD, and $$N(TrackNo) = \frac{-17696 + \sqrt{3132 + 0.00133686\, S(SectorNo)}}{1351.351351351^{-1}} \quad (8)$$

for a dual-layer DVD.

In the similar manner, the following equation of a track number N for a CD can be also calculated as follows:

$$N(TrackNo) = \frac{-25 + \sqrt{625 + 0.008488263631568 \cdot S(SectorNo)}}{625^{-1}} \quad (9)$$

where the sector number S is related with pre-written Absolute Time (AMIN:ASEC:AFRAME) according to the following equation:

$$S(\text{sector No.})=60\times 75\times \text{'AMIN'}+75\times \text{'ASEC'}+\text{'AFRAME'} \quad (10)$$

The values of the parameters p, L, and r1 used in Eq. (9) are 1.6 μm, '588×98×1.25/(4.3218×10^6)'m, and 25 mm, respectively.

Eq. (9) is a result derived for a certain scanning speed. Therefore, Eq. (9) may give some error in the track number calculation for a CD manufactured through different scanning speeds. However, by repeating track searches in the search mode, Eq. (9) can be tuned gradually to give an exact result, namely, an exact track number including a current sector.

Therefore, if the disk currently placed on the disk tray is a CD, an absolute time AMIN:ASEC:AFRAME written in a sub-Q code of the disk is detected from a current data block first and then the track number is computed by using Eqs. (9) and (10). Finally, a desired brake voltage applying time is obtained using Eqs. (A) and (B).

Figure 6:
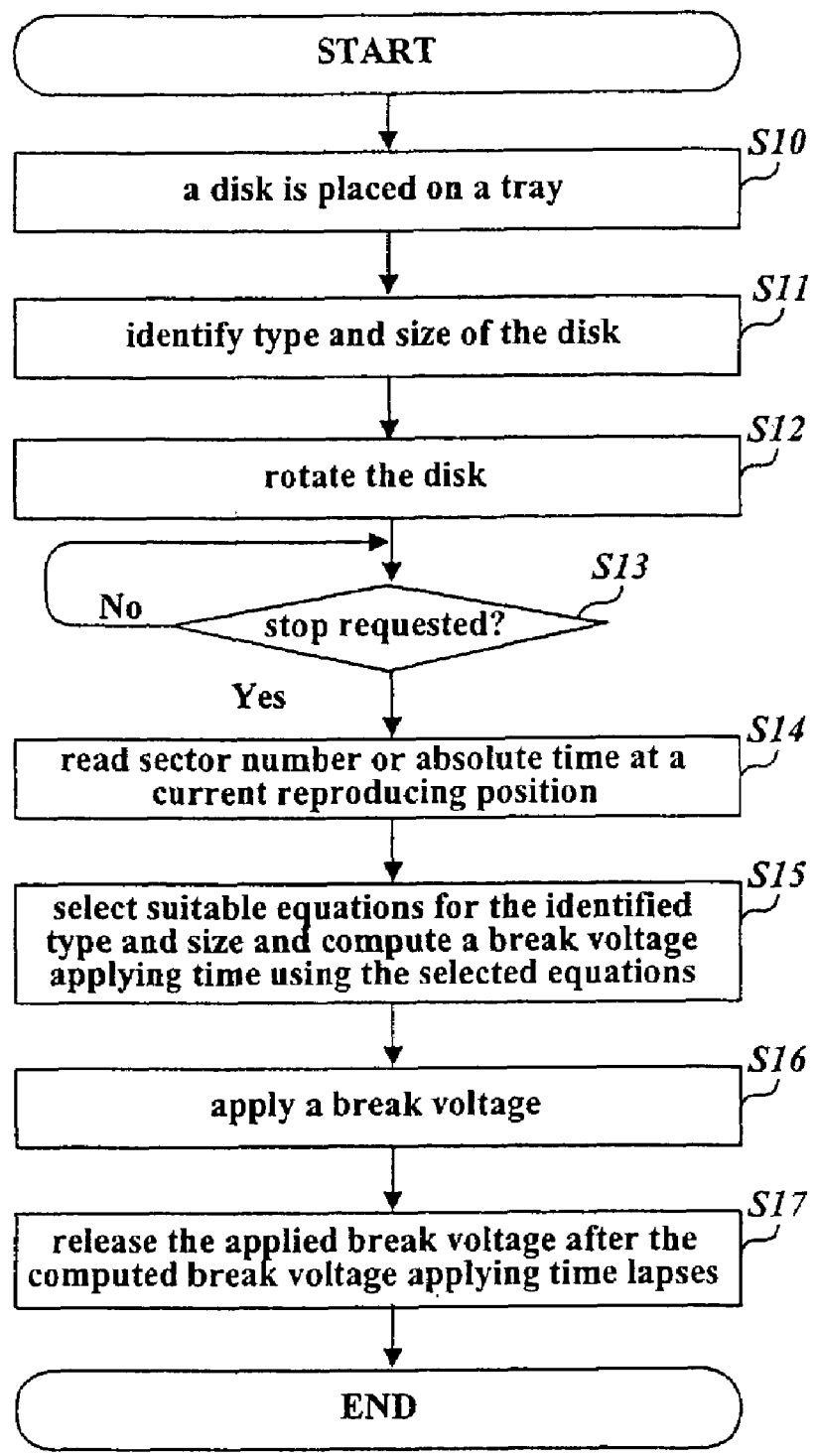
FIG. 6 is a flow chart illustrating a method of stopping a rotating disk in accordance with an embodiment of the present invention.

FIG. 6 is a flow chart illustrating processing steps of the method for stopping a rotating disk in accordance with an embodiment of the present invention. This method is implementable by or in the disk device of FIG. 2.

As shown in FIG. 6, when a disk 10 is placed on a disk tray 19 of a disk device such as the disk device shown in FIG. 2 (S10), the type of the disk 10 placed on the disk tray is identified by using existing disk type detection methods. For example, an "S-curve" technique may be used to identify the disk type. In the S-curve technique, a pickup impinges a light beam onto a disk and determines the time it takes for the light beam to return from the disk. Since CDs and DVDs have a recording layer at different thickness locations of the disk, the light beam impinging on the CDs generally will take longer to return than the light beam impinging on the DVDs. Based on the return time information, it can be determined whether the disk is a CD or a DVD. Further, if multiple return beams are detected by the pickup within a set time period, then the disk is determined to be a double-layered DVD, instead of a single-layered DVD. This technique is known in the art.

In this embodiment, the disk 10 can be one of three different types: a CD, a single-layered DVD, or a dual-layered DVD. Once the disk type is determined, the above-explained disk size determining algorithm is carried out to determine the size and presence of the disk on the disk tray (S11). Then the characteristics of a servo mechanism is adjusted to adapt to the identified disk type and then the disk 10 on the disk tray is rotated as the spindle motor 14 rotates by the operation of the driving unit 16 (S12).

While the spindle motor 14 is rotating, a general data recording/reproducing or other operation may be conducted on the rotating disk. During this operation, if a disk rotation stop is requested (S13), the controller 27 reads a sector number on the disk 10 or an absolute time at that position on the rotating disk (S14).

Afterwards, if the disk type of the disk 10 has been identified to be a single-layered DVD, the controller 27 computes a brake voltage applying time t using Equations (7), (B), and (A) (S15) based on the identified disk size and type information, and then applies a brake voltage to the spindle motor 14 (S16) for the computed brake voltage applying time t. The brake voltage maintained for the computed brake voltage applying time t is then released once the computed brake voltage applying time t expires (S17). Such a finite-time brake voltage applying technique stops the rotating disk with precision, e.g., without any over rotation in a reverse direction.

If it has been determined at Step S11 that the disk 10 on the disk tray is a dual-layered DVD, then Equations (8), (B), and (A) are used sequentially to calculate an exact brake voltage applying time t for the rotating disk 10 based on the identified disk size and type information. On the other hand, if it has been determined that the disk 10 is a CD, then Equations (10), (9), (B), and (A) are used to compute the exact brake voltage applying time t for the rotating disk 10 (S15). Then, the brake voltage is applied to the spindle motor 14 only for the computed brake voltage applying time t (S16).

As explained above, if the current position (sector or absolute time information) of the disk (i.e., the position on the disk currently accessed or operated on by the pickup when the disk rotation stop request is received) is detected, the radius of that position and then the brake voltage applying time suitable for that radius can be calculated.

In accordance with another embodiment, the sector number (or absolute time) vs. brake voltage applying time for all different disk types and disk sizes may be pre-calculated, so that they can be immediately accessed once the disk type and/or size is identified at step S11 without computation. That is, the radius of the current position on the disk can be calculated with the chosen equations. The brake voltage applying time is determined using Eq. (A), and the sector number (or absolute time) vs. brake voltage applying time for all disk types and various sizes can be tabulated beforehand using the above related equations. Then an appropriate brake voltage applying time for a detected sector number (or absolute time) can be obtained immediately without any computation by referring to this pre-calculated information.

In still another embodiment, the radius (or sector number, absolute time) vs. brake voltage applying time may be tabulated beforehand for only one disk type and a single size. In this case, a brake voltage applying time for other types and other sizes are obtained by using a proportional relationship.

For instance, considering a rotational inertia momentum and a disk driving angular velocity of each disk, a proportional relationship among major disks is determined to be:

$$Tcd8 = 0.1973 \times Tcd12 = 0.07066 \times Tdvd12 \quad (11)$$

where $Tcd8$, $Tcd12$, and $Tdvd12$ are brake voltage applying times for a 8 cm-CD, a 12 cm-CD, and a 12 cm-DVD, respectively.

As one example, if the radius vs. brake voltage applying time for a 8 cm-CD is tabulated, a desired brake voltage applying time for a certain radius is read from a given table for a 8 cm-CD after calculating the radius of the current position on the disk from the detected sector or absolute time information using the above suitable equation. However, if the disk placed on the disk tray is not a 8 cm-CD, but is a 12 cm-CD, then the radius of the current position is calculated first using the above equation based on the current location information such as absolute time, and the brake voltage applying time for that calculated radius is sought in the given table for the 8 cm CD. Then, a desired brake voltage applying time for the 12 cm-disk currently placed on the disk is obtained by multiplying the sought time by a proportional coefficient given by, e.g., Eq. (11). That is, multiplying the time $Tcd8$ by 5.068 (=1/0.1973) gives the desired applying time $Tcd12$ for the 12 cm-CD. If the disk on the disk tray is a 12 cm-DVD, then the value of 14.152 (=1/0.07066) is multiplied by the value of $Tcd8$ to obtain the brake voltage applying time for the 12 cm-DVD.

In Eq. (11), the proportional relationship between the 8 cm CD, 12 cm CD and 12 cm DVD are provided. Depending on the availability of different types and sizes of optical recording mediums, the proportional relationship of the brake applying time between these recording mediums may be determined in advance as needed.

If a table for only one disk type and one disk size is provided in advance as explained above, this saves memory space remarkably.

According to the embodiments of the present invention, the above-explained method can determine the presence or absence of a disk and/or disk size and can stop a rotating spindle motor with precision without the use of an FG sensor, whereby reducing the size and cost of a disk device.

Although the embodiments of the present invention have been described in connection with determining the characteristics of 8 cm CDs, 12 cm CDs, and single or dual-layered DVDs, the present invention is equally applicable to other types and sizes of disks and other optical recording mediums.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of stopping a rotating optical recording medium in a recording medium device, the method comprising the steps of:
   (a) determining position information for a current position of a pickup on the rotating recording medium when a recording medium rotation stop request is received;
   (b) determining a brake voltage applying time based on the determined position information and a proportional relationship between a brake voltage applying time at said position of the pickup and a brake voltage applying time at the start position of a program area on the recording medium; and
   (c) applying a brake voltage to a motor for a duration of the determined brake voltage applying time to stop the rotating recording medium.

2. The method of claim 1, wherein, if the recording medium is a DVD, the determined position information includes sector information.

3. The method of claim 1, wherein, if the recording medium is a CD, the determined position information includes absolute time information written on the recording medium.

4. The method of claim 1, wherein said step (b) includes the steps of:
   (b1) calculating a track number of said current position using the determined position information;
   (b2) calculating a radius at said current position based on the calculated track number; and
   (b3) calculating the brake voltage applying time based on the calculated radius.

5. The method of claim 4, wherein, in the calculation of the radius at said current position, said step (b2) uses a radius at a program area start position of the recording medium, a track pitch of the recording medium, and the calculated track number obtained from said step (b1).

6. The method of claim 5, wherein said radius at the program area start position varies depending on a type of the recording medium.

7. The method of claim 4, wherein, in the calculation of the brake voltage applying time, said step (b3) uses a radius at a program area start position of the recording medium, a brake voltage applying time set for that radius, and the calculated radius obtained from said step (b2).

8. The method of claim 7, wherein said radius at the program area start position varies depending on a type of the recording medium.

9. The method of claim 4, wherein said step (b) includes the steps of:
   (b4) calculating a radius at said current position based on the determined position information; and
   (b5) determining the brake voltage applying time associated with the calculated radius by referring to a predetermined table, the predetermined table identifying a relation between radius information and a brake voltage applying time for one particular disk type and size.

10. The method of claim 9, wherein, if the predetermined table does not identify the relation for the type and size of the recording medium, then said step (b) further includes the steps of:

(b6) accessing a brake time applying time stored in the predetermined table that corresponds to the calculated radius obtained from said step (b4); and (b7) computing the brake time applying time for the recording medium based on the brake time applying time accessed in said step (b6) by using a proportional relationship between brake voltage applying times among different types and/or sizes of recording mediums.

11. The method of claim 1, wherein said step (b) determines, by referring to a predetermined table, the brake voltage applying time associated with the determined position information, where said predetermined table identifies a relation between position information of the recording medium and a brake voltage applying time for different disk types and sizes.

12. A device for stopping a rotating optical recording medium, comprising:

a pickup to access the optical recording medium;

a motor to rotate the optical recording medium;

a controller to control the pickup and the motor, to determine a brake voltage applying time to stop the rotating recording medium without using frequency generating signals, and to apply a brake voltage to the motor for a duration of the determined brake voltage applying time to stop the rotating recording medium; and a radio frequency unit to detect a light beam returning from the recording medium;

wherein the controller (1) determines, based on the detection by the radio frequency unit, position information on a current position of the pickup on the rotating recording medium when a recording medium rotation stop request is received, (2) determines the brake voltage applying time based on the determined position information, a type of recording medium, and a size of the recording medium and (3) calculates a track number of said current position using the determined position information, calculates a radius at said current position based on the calculated track number, and calculates the brake voltage applying time based on the calculated radius.

13. The device of claim 12, wherein, in the calculation of the radius at said current position, the controller uses a radius at a program area start position of the recording medium, a track pitch of the recording medium, and the calculated track number.

14. The device of claim 13, wherein said radius at the program area start position varies depending on the type of the recording medium.

15. The device of claim 12, wherein, in the calculation of the brake voltage applying time, the controller uses a radius at a program area start position of the recording medium, a brake voltage applying time set for that radius, and the calculated radius at said current position.

16. The device of claim 15, wherein said radius at the program area start position varies depending on the type of the recording medium.

17. The device of claim 12, wherein the controller determines, by referring to a predetermined table, the brake voltage applying time associated with the determined position information, where said predetermined table identifies a relation between position information of the recording medium and a brake voltage applying time for different disk types and sizes.

18. The device of claim 12, wherein the controller calculates a radius at said current position based on the determined position information, and determines the brake voltage applying time associated with the calculated radius by referring to a predetermined table, the predetermined table identifying a relation between radius information and a brake voltage applying time for one particular disk type and size.

19. The device of claim 12, wherein the track number is calculated according to the following equation:

$$N(TrackNo) = \frac{-18.362 + \sqrt{337.2 + 0.00121475 \cdot S(SectorNo)}}{1351.351351351^{-1}}.$$

20. The device of claim 12, wherein the track number is calculated according to the following equation:

$$N(TrackNo) = \frac{-17.696 + \sqrt{313.2 + 0.00133686 \cdot S(SectorNo)}}{1351.351351351^{-1}}.$$

21. The device of claim 12, wherein the track number is calculated according to the following equation:

$$N(TrackNo) = \frac{-25 + \sqrt{625 + 0.008488263631568 \cdot S(SectorNo)}}{625^{-1}}.$$

22. A device for stopping a rotating optical recording medium, comprising:

a pickup to access the optical recording medium;

a motor to rotate the optical recording medium;

a controller to control the pickup and the motor, to determine a brake voltage applying time to stop the rotating recording medium without using frequency generating signals, and to apply a brake voltage to the motor for a duration of the determined brake voltage applying time to stop the rotating recording medium;

a radio frequency unit to detect a light beam returning from the recording medium;

wherein the controller (1) determines, based on the detection by the radio frequency unit, position information on a current position of the pickup on the rotating recording medium when a recording medium rotation stop request is received, (2) determines the brake voltage applying time based on the determined position information, a type of recording medium, and a size of the recording medium and (3) calculates a track number of said current position using the determined position information, calculates a radius at said current position based on the calculated track number, and calculates the brake voltage applying time based on the calculated radius;

wherein the controller calculates a radius at said current position based on the determined position information, and determines the brake voltage applying time associated with the calculated radius by referring to a predetermined table, the predetermined table identifying a relation between radius information and a brake voltage applying time for one particular disk type and size; and wherein, if the predetermined table does not identify the relation for the type and size of the recording medium, then the controller accesses a brake voltage applying time stored in the predetermined table that corresponds to the calculated radius, and computes the brake voltage applying time for the recording medium based on the brake voltage applying time accessed from the predetermined table by using a proportional relationship between brake voltage applying times among different types and/or sizes of recording mediums.

23. A device for stopping a rotating optical recording medium in a recording medium device, the method comprising the steps of:
   (a) position determining means for determining position information for a current position of a pickup on the rotating recording medium when a recording medium rotation stop request is received;
   (b) brake voltage determining means for determining a brake voltage applying time based on the determined position information and a proportional relationship between a brake voltage applying time at said position of the pickup and a brake voltage applying time at the start position of a program area on the recording medium; and
   (c) application means for applying a brake voltage to a motor for a duration of the determined brake voltage applying time to stop the rotating recording medium.

24. A method of stopping a rotating optical recording medium in a recording medium device, the method comprising the steps of:
   determining position information for a current position of a pickup on the rotating recording medium based on a type and a size of a recording medium when a recording medium rotation stop request is received;
   (b) determining a brake voltage applying time without using frequency generating signals based on the determined position information and a proportional relationship between a brake voltage applying time at said position of the pickup and a brake voltage applying time at the start position of a program area on the recording medium; and
   (c) applying a brake voltage to a motor for a duration of the determined brake voltage applying time to stop the rotating recording medium.

25. A device for stopping a rotating optical recording medium in a recording medium device, comprising:
   (a) means for determining position information for a current position of a pickup on the rotating recording medium based on a type and a size of a recording medium when a recording medium rotation stop request is received;
   (b) means for determining a brake voltage applying time without using frequency generating signals based on the determined position information and a proportional relationship between a brake voltage applying time at said position of the pickup and a brake voltage applying time at the start position of a program area on the recording medium; and
   (c) means for applying a brake voltage to a motor for a duration of the determined brake voltage applying time to stop the rotating recording medium.

26. A device for stopping a rotating optical recording medium, comprising:
   a pickup to access the optical recording medium;
   a motor to rotate the optical recording medium;
   a controller to control the pickup and the motor and to determine a brake voltage applying time to stop the rotating recording medium by referring to a predetermined table, wherein the predetermined table identifies a relation between position information of the recording medium and a brake voltage applying time for different disc types and sizes.

27. A device for stopping a rotating optical recording medium, comprising:
   a pickup to access the optical recording medium;
   a motor to rotate the optical recording medium;
   a controller to control the pickup and the motor and to determine a brake voltage applying time to stop the rotating recording medium by referring to a predetermined table,
   wherein, if the predetermined table does not identify the relation for the type and size of the recording medium, then the controller calculates a brake voltage applying time by using a proportional relationship between brake voltage applying times among different types and/or sizes of recording media.

* * * * *